Jan. 28, 1947.     K. W. HARPER     2,414,871
OPTICAL TESTING INSTRUMENT
Filed June 18, 1943     3 Sheets-Sheet 1
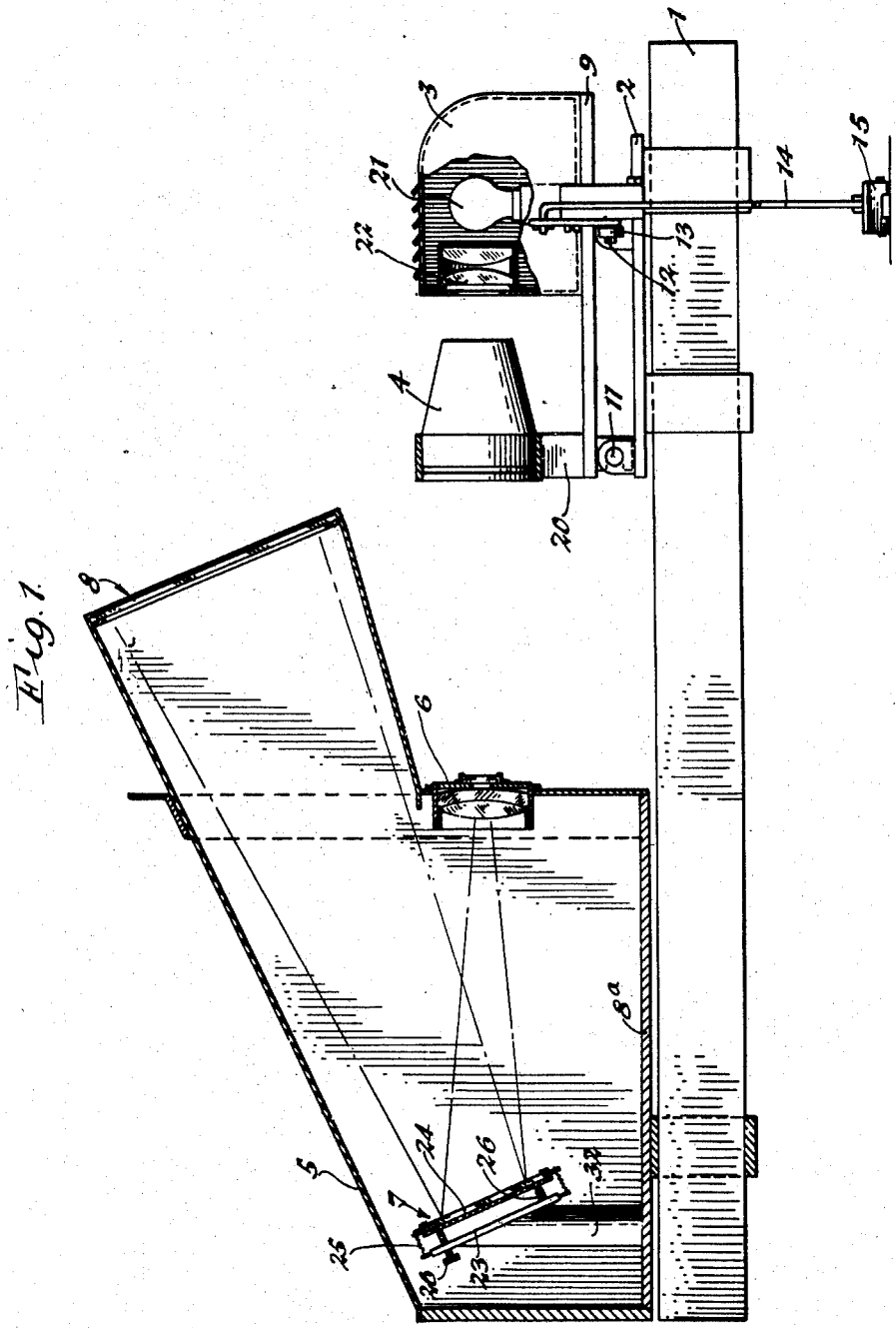
INVENTOR.
KENNARD W. HARPER
BY Raymond A. Paquin
ATTORNEY

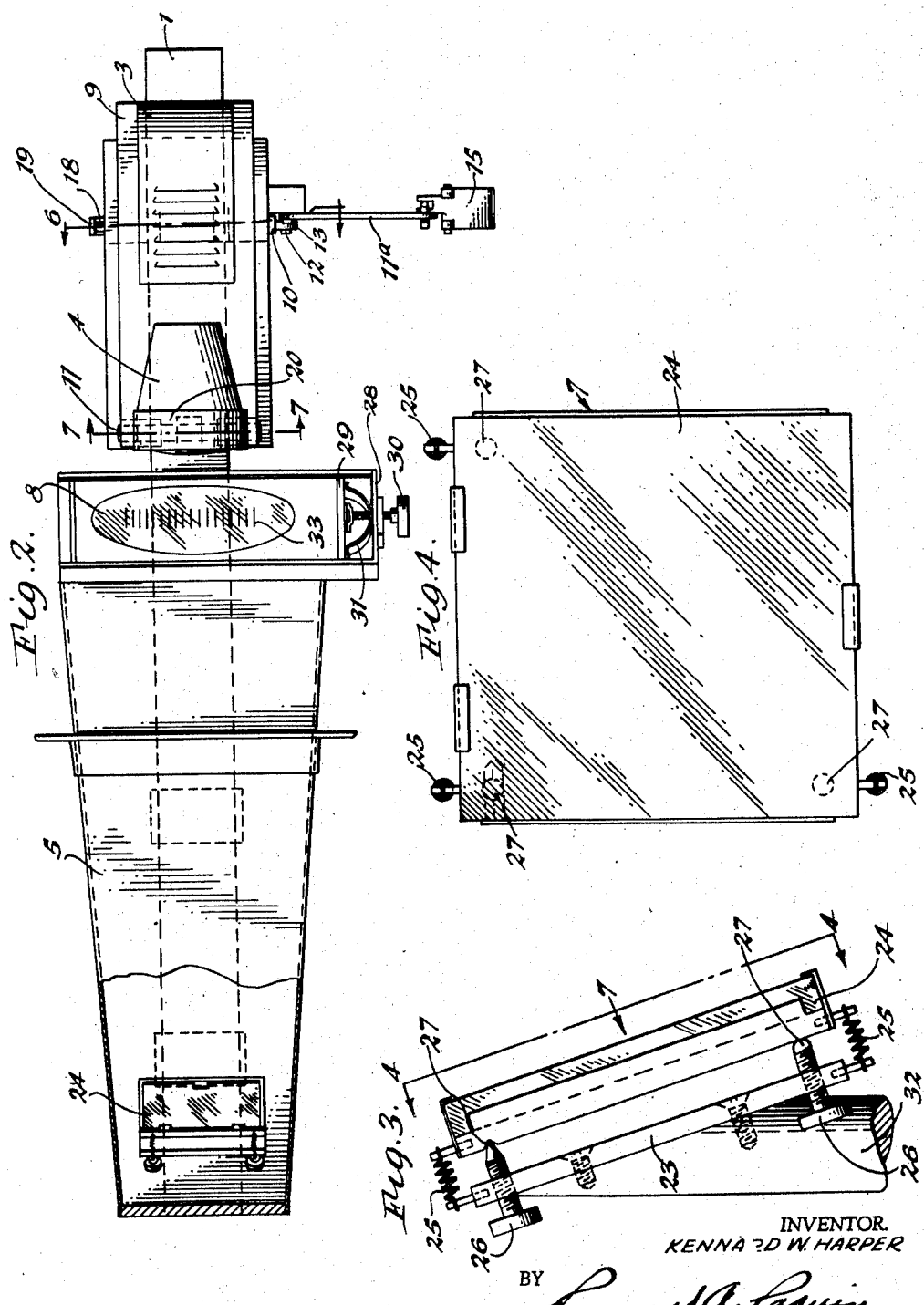

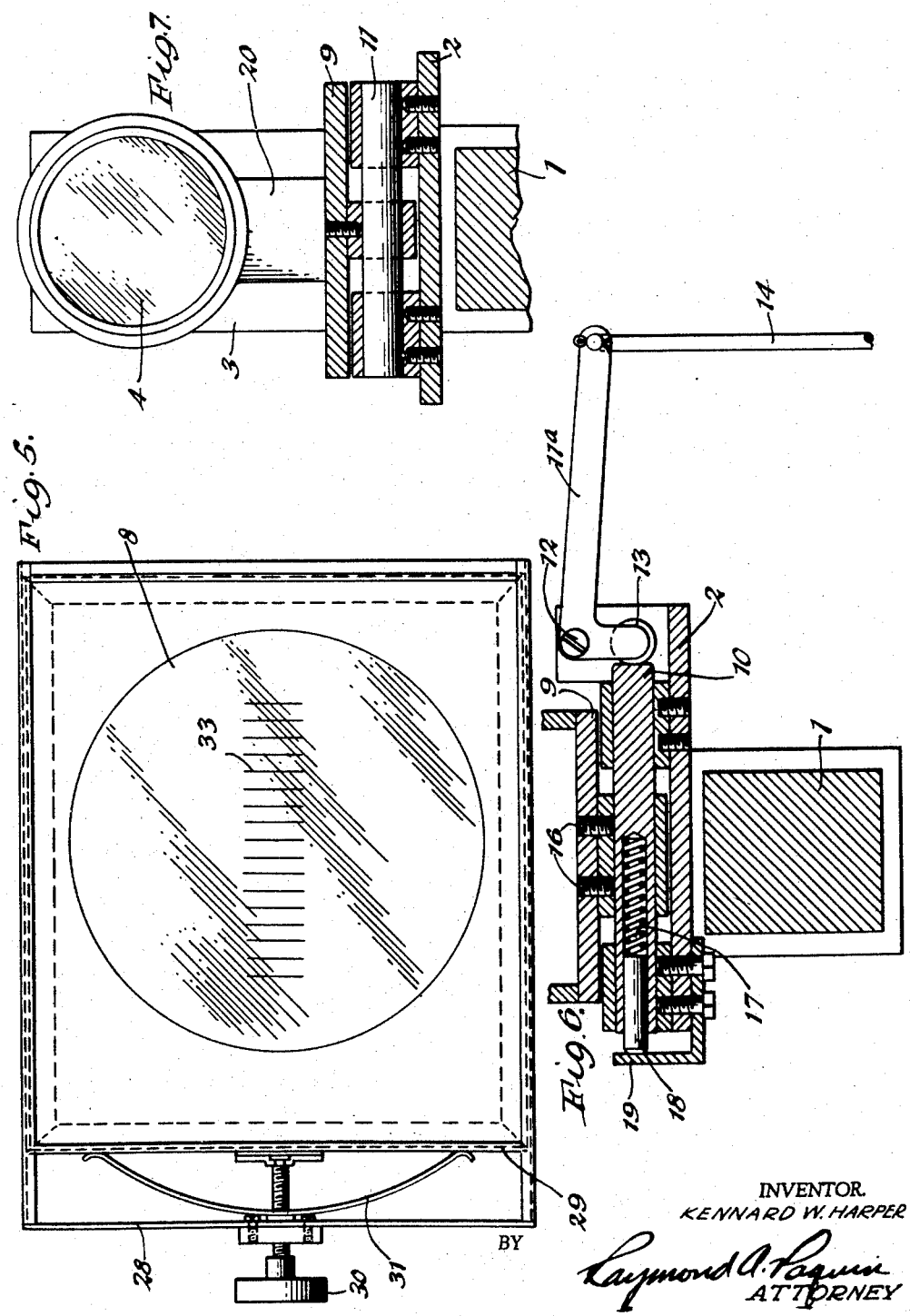

Patented Jan. 28, 1947

2,414,871

UNITED STATES PATENT OFFICE 2,414,871

OPTICAL TESTING INSTRUMENT

Kennard W. Harper, East Aurora, N. Y., assignor, by mesne assignments, to American Optical Company, Southbridge, Mass., a voluntary association Application June 18, 1943, Serial No. 491,325

6 Claims. (Cl. 88—24)

This invention relates to a new and improved means and method for testing optical instruments containing reticules, scales or the like, for parallax and for checking the size and shape and width of the lines of said reticule or scale.

An object of the invention is to provide a new and improved means and method for testing an optical instrument for parallax and dimensions of reticules or the like by projection.

Another object of the invention is to provide new and improved means for adjustably supporting the instrument during the testing thereof.

Another object of the invention is to provide a new and improved apparatus having a projection system for testing or checking optical instruments.

Other objects and advantages of the invention will be apparent from the following description taken in connection with the accompanying drawings.

It will be understood that many changes may be made in the details of construction, arrangement of parts, and steps of the process without departing from the scope of the invention as set forth in the accompanying claims. I, therefore, do not wish to be limited to the exact details of construction, arrangement of parts, and steps of the process shown and described as the preferred form has been shown by way of illustration only.

Referring to the drawings:

Fig. 1 is a side view partially in section of an instrument constructed according to the invention;

Fig. 2 is a top or plan view thereof also partly in section;

Fig. 3 is an end view on an enlarged scale of the reflector arrangement shown in Figs. 1 and 2;

Fig. 4 is a view taken on line 4—4 of Fig. 3 looking in the direction of the arrows;

Fig. 5 is a front view on an enlarged scale of the projection screen shown in Figs. 1 and 2;

Fig. 6 is a sectional view taken on line 6—6 of Fig. 2 showing the means for adjusting the projection arrangement and;

Fig. 7 is a sectional view on an enlarged scale taken on line 7—7 of Fig. 2 looking in the direction of the arrows;

In the manufacture of optical instruments it is important that the instrument be free from parallax or at least that the amount of parallax be within such limitations as not to seriously interfere with the optical prism of the instrument. It is also desirable in optical instruments containing reticules that the reticules be of proper size and that lines forming the reticule or scale be of proper width.

In the checking or testing for parallax in the past it has been customary to view a distant object through the instrument and then for the observer to move his head in a side wise direction and observe the extent of movement, if any, of the object. This movement of the image indicates whether or not parallax is present and the amount thereof is indicated by the amount of movement of the image or object. It will be seen that the constant checking of such optical device by the above method is also both tiresome and inaccurate to the extent that it relies upon the judgment of the operator or observer. It therefore is an object of the present invention to provide a new and improved means and method for testing optical instruments for parallax and also for checking the dimensions of the reticules of such instrument.

Referring more particularly to the drawings, wherein similar reference characters designate corresponding parts throughout the several views, the device shown for carrying out the invention comprises a base 1 adapted to support the support 2 for the light projector 3 and instrument to be tested 4. Adjacent the opposite end of the support, and in proper spaced relation with the projector 3 and instrument 4, is the housing or cabinet member 5 having the objective lens system 6 in an opening in the wall of said member 5 and in optical alignment with the instrument 4.

Adjacent the rear wall of the housing 5 is positioned the reflector member 7 and the upper portion of the front surface of the wall of the housing contains the ground glass screen or the like 8.

The light projector 3 and instrument 4 are supported on the adjustable support 9 which is transversely slideable on the centers 10 and 11 and adapted to be moved by means of the pivoted lever 11a which is pivoted at 12 and which has a roller 13 adapted to engage an end of the member 10 for adjusting the support 9. The lever 11a is connected by means of a strap or the like 14 to the foot treadle 15 whereby pressure on the foot treadle will pivot the lever on its center 12 and, through said engagement of the roller 13 with the member 10, cause lateral displacement of the support 9, which is secured to the member 10 by means of the screws or the like 16, against the action of the spring 17 which is contained in a hollow bore in the member 10 and which bore also contains the pin 18 which is adapted to engage the stop member 19.

Due to the action of the spring 17 it will be seen that upon release of the foot treadle 15 the support 9 will be resiliently urged transversely towards its normal position.

The instrument 4, which is the instrument under test, is supported by means of the upright support member 20. It will be apparent that the means for securing the instrument 4 in position should be a construction that will allow the easy and quick insertion or removal of the instrument to facilitate the testing of numerous instruments without the loss of considerable time in positioning the instruments to be tested or removal of these instruments from the apparatus.

The light projector 3 contains the lamp or bulb 21 and condensing lens system 22 which are optically aligned with the instrument 4 which instrument is optically aligned with the objective lens system 6 and reflector 7 so that an image of the reticule or scale contained in the instrument 4 will be projected onto the ground glass screen 8.

The reflector 7 may be adjustably mounted to allow adjustment thereof to the proper angle to reflect an image onto the screen 8. This construction comprises a support 23 to which is secured the reflector member 24 by means of the coil springs 25 as shown in the drawings. The 3 set screws 26 are threaded through openings in the support 23 and engage the rear surface of the reflector member 24 at the points 27. It will be seen that with this construction it is possible to align the reflector 24 to the angle necessary to reflect the image of the reticule or scale in the instrument 4 onto the screen 8 as previously described. The support 23 is mounted on a pedestal 32 carried by a base plate 8a.

The ground glass screen is provided with the frame 28 in which is slideably mounted the screen member 29 which may be adjusted by means of the knob 30 against the action of the plate spring member 31 so that by means of the spring 31 and knob 30 the screen may be adjusted transversely to the desired position.

On the screen 29 are provided the reference lines or the like 33 for checking the reticule or scale in the instrument 4. These lines may be of desired number and size depending upon the particular reticule or scale to be checked.

In carrying out the method of the present construction an instrument 4 is placed on its support as shown in Figs. 1 and 2 and which support positions the reticule of the instrument 4 in the focal plane of the light rays which emanate from the lamp 21 and are condensed by the condensing lens system 22 and an image of the reticule is formed on the screen 8.

The lines or scale on the screen is aligned with the image projected on the screen by turning the knob 30 which moves the screen and scale 8.

The operator then steps down on the foot treadle 15, which causes lateral adjustment of the support 9, instrument 4 and projector 3 and then the operator observes any displacement of the projected image on the screen 8 which denotes whether or not the instrument is free from parallax. In the same manner, it is possible for the observer to check whether or not the dimensions of the line of the reticule or scale are correct by inspection of the image on the screen 8.

By the use of lines on the screen 8 designating the amount of tolerance for the parallax contained by the particular instrument it can be readily determined whether or not the instrument is within the inspection limits set up by the manufacturer.

While the instrument is shown horizontally, it is apparent that it may be placed in a vertical position if desired.

From the foregoing it will be seen that I have provided a means and method for obtaining all of the objects and advantages of the invention.

Having described my invention, I claim:

1. Optical testing apparatus comprising means for mounting an optical instrument to be tested, said instrument having a reticule or scale, a source of illumination in alignment with the optical axis of said instrument for transmitting light through said instrument, projecting means optically aligned with said mounting means and instrument so as to collimate the instrument being tested, said projecting means having an image viewing surface, said mounting means comprising mechanism for bodily shifting the instrument transversely relative to its optical axis a predetermined amount within the field of said projecting means and while constantly maintaining the optical axis of the instrument parallel to the optical axis of said projecting means so that any movement of the image on said viewing surface may be observed.

2. Optical testing apparatus comprising projecting means including a lens system and a screen in optical alignment for projecting upon said screen an image whose focal distance from the lens system of said projecting means is infinite, and means for mounting in optical alignment with said projecting means an instrument to be tested, said instrument having a recticule or scale, a source of illumination for directing light through said instrument, the image of said reticule or scale being focused at infinity, said mounting means including a slide for bodily shifting the instrument transversely of the field of said projecting means a predetermined amount within said field while maintaining the optical axis of said instrument in parallelism with the axis of said projecting means so that movement, if any, of the image of the scale or reticule on the screen may be observed.

3. Optical testing apparatus as set forth in claim 2 in which the source of illumination for said projecting means is mounted to slide transversely with the instrument to be tested.

4. The method of testing an instrument to determine the presence or absence of errors in parallax therein comprising transmitting a beam of light through said instrument and toward an objective lens system axially aligned therewith and arranged to project an image of a reticule or scale contained by said instrument upon a viewing screen associated therewith, shifting said screen transversely relative to said projected image to cause a reference mark carried by the screen to be aligned with a selected portion of said image upon said screen, shifting said instrument transversely with respect to the optical axis of said objective lens system a predetermined amount while maintaining the optical axis of said instrument and said objective lens system in parallelism and while continuing to image said reticule or scale upon said screen, and observing the selected portion of said image upon said screen to determine if any shifting thereof relative to said reference mark occurs to indicate an error in parallax in said instrument.

5. The method of testing an instrument for determining the presence or absence of errors in parallax comprising optically aligning said instrument with illuminating means on one side and on the other side with an objective lens system provided with a viewing screen, causing a beam of light from said illuminating means to be transmitted through said instrument and toward said objective lens system so that an image of a reticule or scale contained by said instrument will be projected thereby on to said viewing screen, shifting said screen transversely relative to said projected image to cause a reference mark carried by said screen to be aligned with a selected portion of said projected image, shifting said instrument transversely a predetermined amount with respect to the optical axis of said objective lens system while maintaining the optical axis of the instrument in parallelism therewith and while continuing to image said recticule or scale upon said screen, and simultaneously observing the selected portion of the image upon such screen to determine if any shifting thereof relative to said reference mark occurs to indicate an error in parallax in said instrument.

6. The method of testing an instrument for parallax as set forth in claim 5 and in which the illuminating means for directing light through the instrument and projecting the image of the scale or reticule contained by the instrument is shifted transversely simultaneously with the shifting of said instrument.

KENNARD W. HARPER.